(12) United States Patent
Williams

(10) Patent No.: US 10,491,709 B2
(45) Date of Patent: Nov. 26, 2019

(54) TIME AND LOCATION BASED DISTRIBUTION OF ADDITIONAL CONTENT FOR CONTENT ITEMS

(71) Applicant: Facebook, Inc., Menlo Park, CA (US)

(72) Inventor: Blake Ethan Williams, London (GB)

(73) Assignee: Facebook, Inc., Menlo Park, CA (US)

( * ) Notice: Subject to any disclaimer, the term of this patent is extended or adjusted under 35 U.S.C. 154(b) by 143 days.

(21) Appl. No.: 15/273,490

(22) Filed: Sep. 22, 2016

(65) Prior Publication Data

US 2018/0084079 A1    Mar. 22, 2018

(51) Int. Cl.
```
H04L 29/08    (2006.01)
G06Q 30/02    (2012.01)
H04W 4/00     (2018.01)
H04W 4/21     (2018.01)
```

(52) U.S. Cl.
CPC ....... *H04L 67/327* (2013.01); *G06Q 30/0251* (2013.01); *H04W 4/00* (2013.01); *H04W 4/21* (2018.02); *H04L 67/18* (2013.01)

(58) Field of Classification Search
CPC .... H04L 67/327; H04L 67/18; G06Q 30/0251
See application file for complete search history.

(56) References Cited

U.S. PATENT DOCUMENTS

| | | | | |
|---|---|---|---|---|
| 5,909,023 A | * | 6/1999 | Ono | G06Q 10/087 235/380 |
| 6,587,835 B1 | * | 7/2003 | Treyz | G06Q 20/12 705/14.64 |
| 2003/0111531 A1 | * | 6/2003 | Williams | G06Q 10/00 235/383 |
| 2005/0012611 A1 | * | 1/2005 | Osman | H04W 4/02 340/539.13 |
| 2010/0023397 A1 | * | 1/2010 | Goldman | G06F 17/30817 705/14.48 |
| 2011/0288917 A1 | * | 11/2011 | Wanek | G06Q 30/00 705/14.5 |
| 2014/0123018 A1 | * | 5/2014 | Park | G06F 3/0484 715/738 |
| 2014/0279208 A1 | * | 9/2014 | Nickitas | G06Q 30/0631 705/26.7 |
| 2017/0178219 A1 | * | 6/2017 | Vaidya | G06Q 30/0631 |

* cited by examiner

*Primary Examiner* — John M Macilwinen
(74) *Attorney, Agent, or Firm* — Fenwick & West LLP

(57) ABSTRACT

An online system provides content items for presentation to users with a mechanism that allows users to opt-in to receive additional content associated with a content item at a later time. Users can opt-in to receive the additional content by selecting a button or icon presented with the content item to select criteria for receiving the additional content in the future. The criteria can be temporal or the criteria can be based on a location. Accordingly, the additional content is presented to the user when at least a threshold portion of the criteria is met.

9 Claims, 8 Drawing Sheets

400A

TIME AND LOCATION BASED DISTRIBUTION OF ADDITIONAL CONTENT FOR CONTENT ITEMS

BACKGROUND

This disclosure relates generally to presenting content items to users and more specifically to online systems presenting additional content associated with content items for presentation to users of an online system.

Online systems presenting content to users, such as social networking systems, search engines, news aggregators, Internet shopping services, and content delivery services, allow content to be presented to large numbers of users. Hence, many online systems allow users to easily communicate content to other users of the online systems. Accordingly, online systems provide an ideal venue for presenting content identifying products or services provided by a user of an online system to increase awareness of the products or services by other users of the online system.

Various online systems receive content from users or third party systems and provide the received content to online system users. Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user (e.g., each "impression" of the sponsored content) or for each interaction with sponsored content by an online system user (e.g., each "conversion"). For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

Thus, online systems select content for presentation to each user that the user is more likely to interact with based on past user interactions of the user with different content. Some users, such as the providers of fast-moving consumer products or services, often have difficulty engaging users of their products or services directly. Such users often rely on brick-and-mortar, digital cross-channel, and shopper marketing partnership methods to provide their consumers with relevant information about products and services. Many of these products are purchased at regular intervals (e.g. dog food, diapers, dish soap, etc.), however, conventional methods for reaching or persuading users of online systems to take action regarding the provider's products or services are unable to adequately connect the providers of these products and services directly with the appropriate users (e.g. consumers of the products or services) or remind them at the appropriate time of the products and services. This may reduce revenue obtained by the online system from interactions with content items and decrease future opportunities for the online system to obtain revenue from the providers of these goods and services (e.g., third party systems or other sources subsequently using the online system to select or to present content to users).

SUMMARY

An online system maintains multiple content items for presentation to users. Content items may be obtained from users of the online system, third party systems, or generated by the online system. The online system presents content items to users via the online system, and may also provide content items to third party systems or to applications for presentation to users of the online system. At least one of the multiple content items is presented with a mechanism that allows users to opt-in to receive additional content associated with the content item at a later time. Users can opt-in to receive the additional content by selecting a button or icon presented with the content item to be presented with an interface for selecting or defining criteria for receiving the additional content in the future. Accordingly, the additional content is presented to the user when at least a threshold portion of the criteria is met. The criteria can be temporal, such as allowing the user to select to receive the additional content in a predetermined amount of time (e.g., 3 weeks) or the criteria can be a location, such as allowing the user to select to receive the additional content within a predetermined distance of a location (e.g., a store, intersection, landmark, etc.).

In one embodiment, each content item corresponds to a consumer product or service that is regularly purchased at a quasi-predictable interval (e.g., dog food, diapers, toothpaste, etc.) and the online system presents sponsored content for the product or service to users of the online system with a reminder option (e.g., a button or icon presented with the sponsored content) via their newsfeeds or other delivery locations. The reminder option, when selected by a user, causes the online system to present an additional interface to the user that includes options for the user to define criteria for receiving a reminder about the sponsored content at a later time. For example, if the online system determines that a user has a dog, based on a number of criteria, the online system may present content for a brand of dog food to the user that is sponsored by the brand of the dog food. Since dog food is commonly purchased by dog owners on a reoccurring basis (e.g., every few weeks or so), the sponsored content is presented with a reminder option to allow the user to opt-in to receiving a reminder when it is time to purchase more dog food at an interval typical for that brand and volume of dog food, for example. Reminders can also be similarly provided using the user's location as a trigger to purchase an item available near the user's location and so forth. In addition, the online system can apply machine learning to learn about the user based on the reminders the user creates and how the user responds to the reminders when reminders are delivered, and use this to provide additional relevant content in the future.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Architecture

Figure 1:
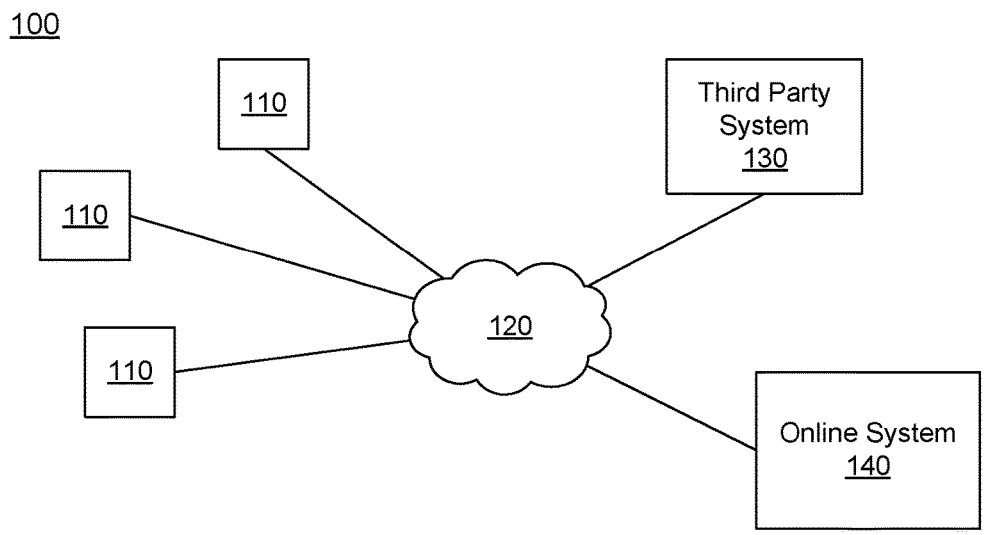
FIG. 1 is a block diagram of a system environment in which an online system operates, in one embodiment.

FIG. 1 is a high level block diagram of a system environment 100 for an online system 140 used for providing additional content associated with content items to users of the online system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, and to other types of online systems.

The client devices 110 are one or more computing devices capable of receiving user input as well as transmitting and/or receiving data via the network 120. The client devices 110 are configured to communicate via the network 120, which may comprise any combination of local area and/or wide area networks, using both wired and/or wireless communication systems. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smart watch or another suitable device. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party systems 130 may also communicate information to the online system 140, such as sponsored content or information about an application provided by the third party system 130.

Figure 2:
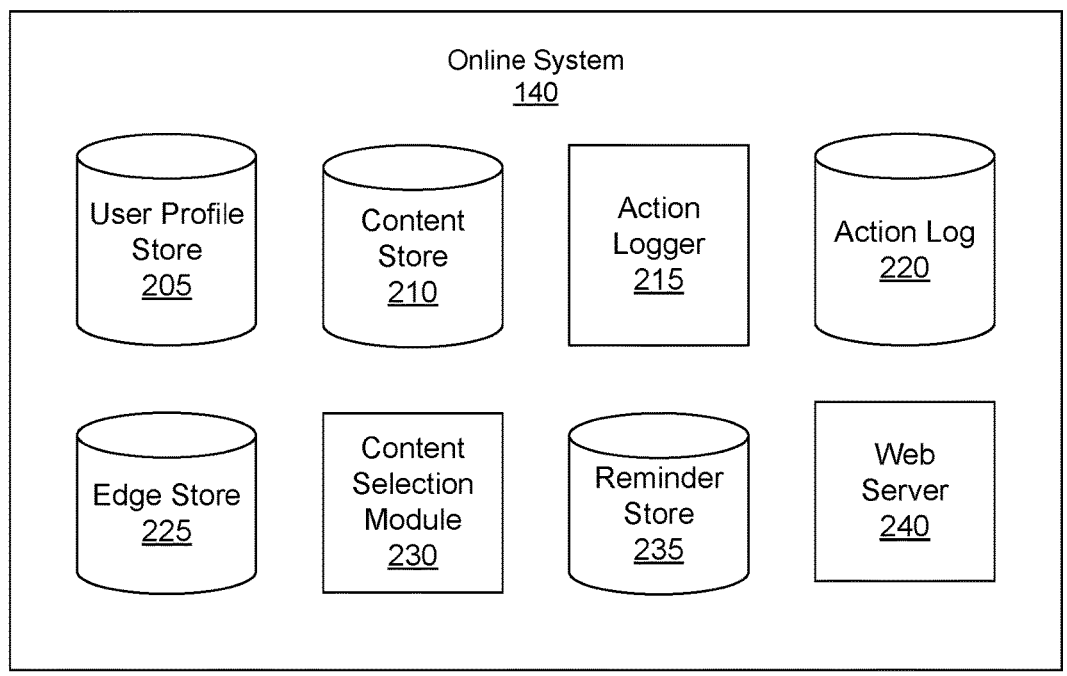
FIG. 2 is a block diagram of an online system, in one embodiment.

FIG. 2 is an example block diagram of architecture of the online system 140. The online system 140 shown in FIG. 2 includes a user profile store 205, a content store 210, an action logger 215, an action log 220, an edge store 225, a reminder store 235, a web server 240, and a content selection module 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140 which can be used for the creation and delivery of sponsored reminders. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content or content "items." Hence, users of the online system 140 are encouraged to communicate with each other by posting text and content items of various types of media through various communication channels. This increases the amount of interaction of users with each other and increases the frequency with which users interact within the online system 140. In some embodiments, the content store 210 stores an image creative associated with the sponsored content that the user uploads to the online system 140.

One or more content items included in the content store 210 include content for presentation to a user and a bid amount. The content is text, image, audio, video, or any other suitable data presented to a user. The bid amount is included in a content item by a user and is used to determine an expected value, such as monetary compensation, provided by an advertiser to the online system 140 if content in the content item is presented to a user, if the content in the content item receives a user interaction when presented including the user opting-in to receive additional content, or if any suitable condition is satisfied when content in the content item is presented to a user. For example, the bid amount included in a content item specifies a monetary amount that the online system 140 receives from a user who provided the content item to the online system 140 if content in the content item is displayed. The online system 140 may further receive an additional monetary amount if the user opts-in to receive the additional content or when the additional content is presented to the user. In some embodiments, the expected value to the online system 140 of presenting the content from the content item may be determined by multiplying the bid amount by a probability of the content of the content item being accessed by a user.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, and checking-in to physical locations via a mobile device, accessing content items, and any other interactions related to the browsing history of the user. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored contents on the online system 140 as well as with other applications operating on the online system 140. In some embodiments, data from the action log 220 is used to infer interests or preferences of a user, augmenting the interests included in the user's user profile and allowing a more complete understanding of user preferences. Further, the action log 220 may also include feedback from the user on various objects in the online system 140.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, sponsored contents that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various ad requests (or other content items) based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which is not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who are not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the feed is a newsfeed and content selection module 230 presents the content to users through the newsfeed via stories. The content selection module 230 may also determine the order in which selected content items are presented via the newsfeed. For example, the content selection module 230 orders content items in the feed based on likelihoods of the user interacting with various content items.

Accordingly, the content selection module 230 presents at least one content item to a user that includes a mechanism to allow the user receive additional content associated with the content item, such as a reminder option to receive additional information or a reminder for the content item. In various embodiments, this mechanism is a button or icon presented with the content item that allows the user to set or define criteria or parameters for receiving the additional content. For example, when the online system 140 receives a selection of the button or icon from the user, online system 140 causes an input interface (e.g., a new page within the online system 140 or an overlay over the previously presented page displaying the content item) to be presented with options that the user may choose or define to set the criteria for receiving the additional content in the future. For example, the criteria can be a certain number of weeks, days, or hours in the future or a specific date. The criteria could also be a location for which the user receives additional content associated with the content item upon coming within a threshold distance.

Online system 140 receives the criteria for receiving the additional content from users via the input interface and stores the criteria in reminder store 235 with an identification of the content item and user. Thus, timing and location information associated with the reminders set by the user is stored in reminder store 235. For example, the user may set the criteria so that the user receives a reminder from the online system 140 in 3 weeks. The criteria user may also or alternatively set the criteria so that the user receives a reminder (for the same or different content item) from the online system 140 for a location by recording Global Positioning System (GPS) data corresponding to the location for which to send the user the additional content or reminder. Accordingly, online system 140 may monitor or track the location of the user via client device 110 and, when online system 140 determines that the user is within a threshold distance from the location (e.g., by comparing the GPS data of client device 110 to the GPS data stored for the location), online system 140 causes the additional content to be presented to the user. For example, the user may set the criteria to receive a reminder when the user is within 5 miles from a store where the user regularly purchases a product associated with a content item presented to the user.

Further, actions taken on the content item to receive the additional content or set the reminder, and actions taken after receiving the additional content or reminder on a client device 110 (e.g., an action indicating that the user visited a page associated with the additional content, added a product to a shopping cart or purchased a product, etc.) can additionally be communicated to the action logger 215 for recordation and association with the user in the action log 220.

Additionally, the reminder store 235 may also store timing information associated with purchases made by users. In one example, the reminder store 235 further stores time difference information related to the time of purchase. For example, the reminder store 235 can store timing information from the most recent purchase of a product and a purchase of the product from the past. In addition, the reminder store 235 keeps track of the difference between the stored timing information and the time period registered by the timer inside the client device 110 based on the user's preference to receive a reminder.

The web server 240 links the online system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or RIM®.

In alternate embodiments, the online system 140 may include additional, fewer, or different components for various applications. Conventional components such as network interfaces, security functions, load balancers, failover servers, management and network operations consoles, and the like are not shown so as to not obscure the details of the system architecture.

Figure 3A:
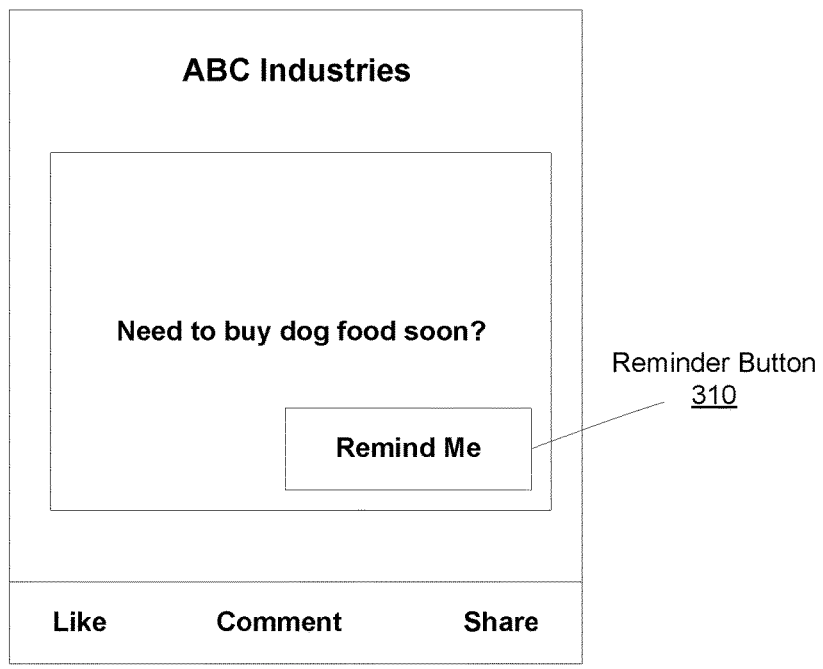
FIG. 3A is an example content item presented to a user with a reminder option, in one embodiment.
Figure 3B:
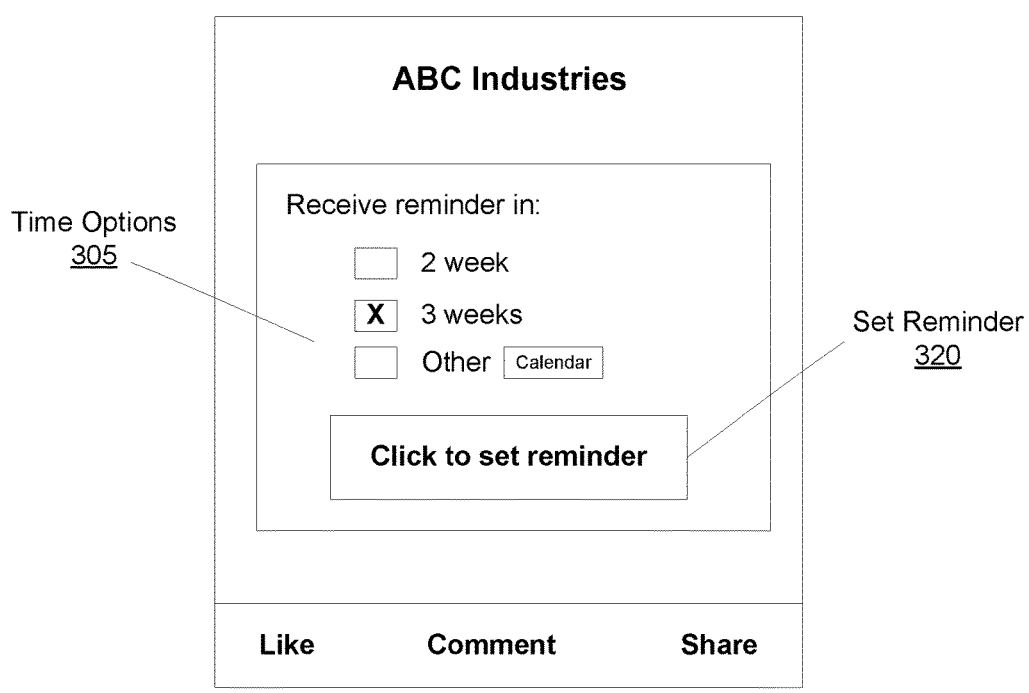
FIG. 3B is an example input interface for defining criteria to receive the reminder option, in one embodiment.
Figure 3C:
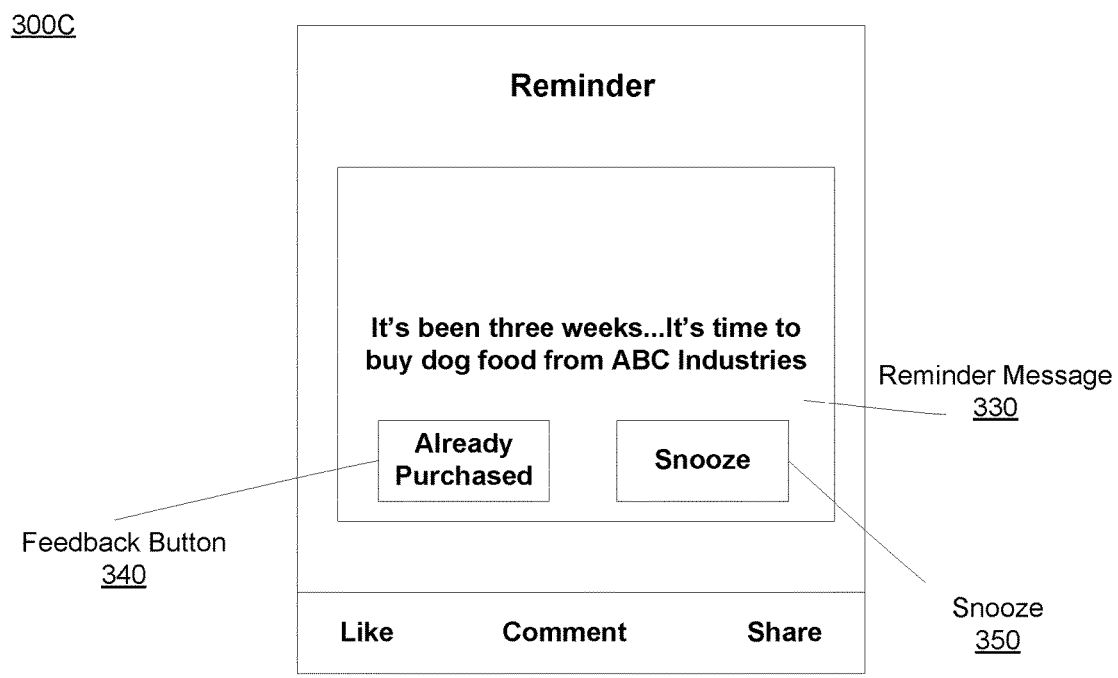
FIG. 3C is an example reminder presented to the user, in one embodiment.

Method of Time and Location Based Distribution of Additional Content for Content Items FIG. 3A-C show an example sequence for presenting additional content to a user, in one embodiment. Although the additional content is described in the examples below as a reminder to purchase a product advertised in a previously presented content item, the additional content is not limited to this application or use-case. Producers of fast-moving consumer goods, such as dog food, have had difficulty engaging the consumers of their products. These fast-moving goods may not easily draw the attention of users via conventional marketing channels; however, these products tend to be goods that users inevitably purchase. Thus, presenting users with an advertisement for a product, such as dog food, with a reminder provides product producers a channel to directly engage customers by providing users with an added service that reminds users when it is time (or convenient via a location-based reminder) to purchase more of a product.

Accordingly, FIG. 3A shows an example sponsored content item 300A presented to a user on a client device 110. In this example, sponsored content item 300A is presented to the user to advertise dog food made by ABC Industries. Sponsored content item 300A includes content identifying ABC Industries, a message that in effect asks the user whether they would like to opt-in to receiving one or more reminders in the future corresponding to when it is time for the user to purchase more dog food, and a reminder button 310 that, when selected, allows the user to set or define the criteria for receiving the reminder. Content item 300A may additionally include information for a particular line of dog food, dog food made for a particular breed, and so forth. The reminder, in various embodiments, is additional content associated with content item 300A that includes a reminder message notifying the user to purchase more dog food and could additionally include a promotional offer (e.g., a discount, buy one get one free, etc.). In one embodiment, users that tap or click the reminder button 310 are presented with an input interface to set or define the criteria for receiving reminder. The input interface can be presented to the user in an overlay above content item 300A, navigate the user to another page, and so forth.

FIG. 3B shows example input interface 300B that includes pre-determined time options 305 that online system 140 has selected for the user to allow the user to choose a time in the future to receive the reminder. In this example, the user selects to receive the reminder in three weeks by selecting a box corresponding to a 3 week time period in time options 305 and subsequently selects the set reminder button 320. Further, the user may have also defined a new time not listed in time options 305. For example, the user could have selected the 'other' option in time options 305 to select a desired date from a calendar application on client device 110 for setting the reminder. Accordingly, online system 140 receives the criteria (e.g., 3 weeks) from the user via input interface 300B and stores the criteria in the reminder store 235. After the selection is confirmed, data corresponding to the user's selection is sent to content store 210 where selection data is stored with other user selections and used to create collections of user selection data. The user selection data can later be used by content selection module 230 to adjust future content selection.

FIG. 3C shows example reminder 300C, in one embodiment. In this example, reminder 300C is presented to the user 3 weeks after the user sets the reminder and includes reminder message 330. Reminder message 330 reminds the user that it is time to purchase more dog food and, since reminder 300C is provided by online system 140 on behalf of ABC Industries, reminder 300C encourages the user to purchase dog food from ABC Industries. The encouragement can, for example, be in the form of a link to a product page where the user can purchase the dog food, include a coupon, and so forth.

In the instance reminder message 330 is not timely (e.g., the user already purchased more dog food, the selected time was too far in the future, etc.), the reminder message 330 includes feedback button 340 that allows the user to indicate whether the user has already purchased dog food. The feedback button 340 enables the online system 140 to train future reminders sent to the client device 110 by adjusting the times suggested to the user in time options 305. For example, online system 140 may prompt the user upon receiving data corresponding to selection of the feedback button 340 for how long ago the user purchased dog food to adjust future time suggestion and/or notify the user. In some embodiments, the online system 140 can train a data set comprising the purchase history of a product using machine-learning techniques to predict the appropriate time frames to suggest to users for the reminders.

Reminder 300C further includes snooze button 350 that allows the user to ignore the current reminder until a later time. The later time may be a default amount of time (e.g., 2 days) set by online system 140 or online system 140 could further prompt the user to provide a time frame for which they would like to receive reminder 300C at a subsequent time. In some embodiments, reminder store 235 additionally tracks user interactions with snooze button 350 to analyze the user's responses in order to adjust future time suggestions and/or notify the user, as above for feedback button 340.

Figure 4A:
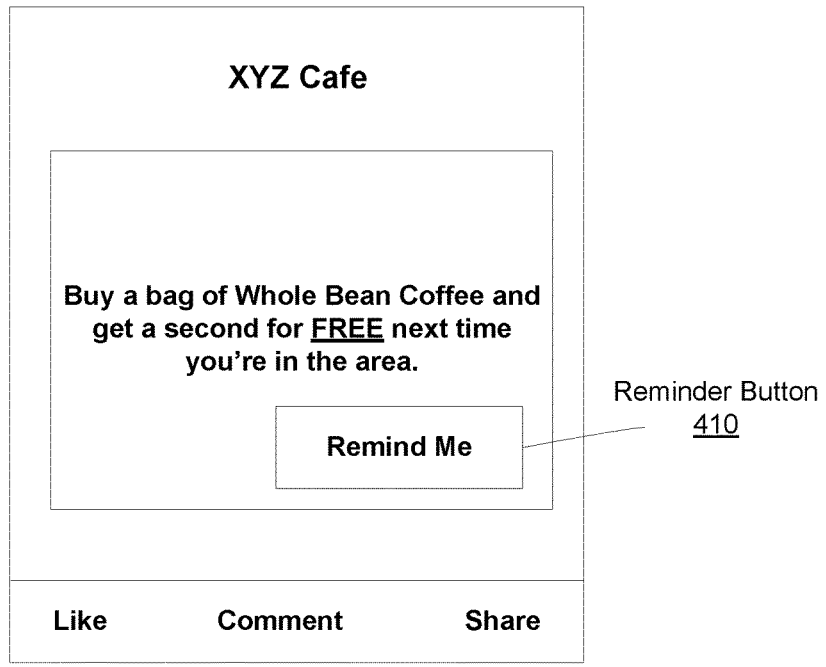
FIG. 4A is another example reminder presented to the user, in one embodiment.
Figure 4B:
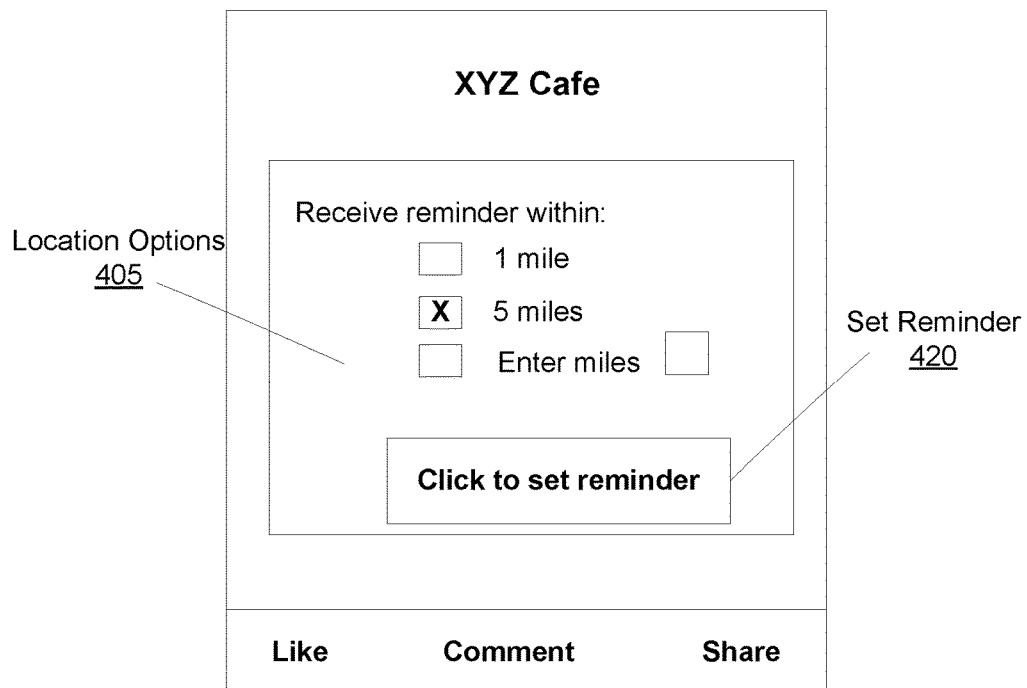
FIG. 4B is an example input interface for defining criteria to receive the reminder, in one embodiment.
Figure 4C:
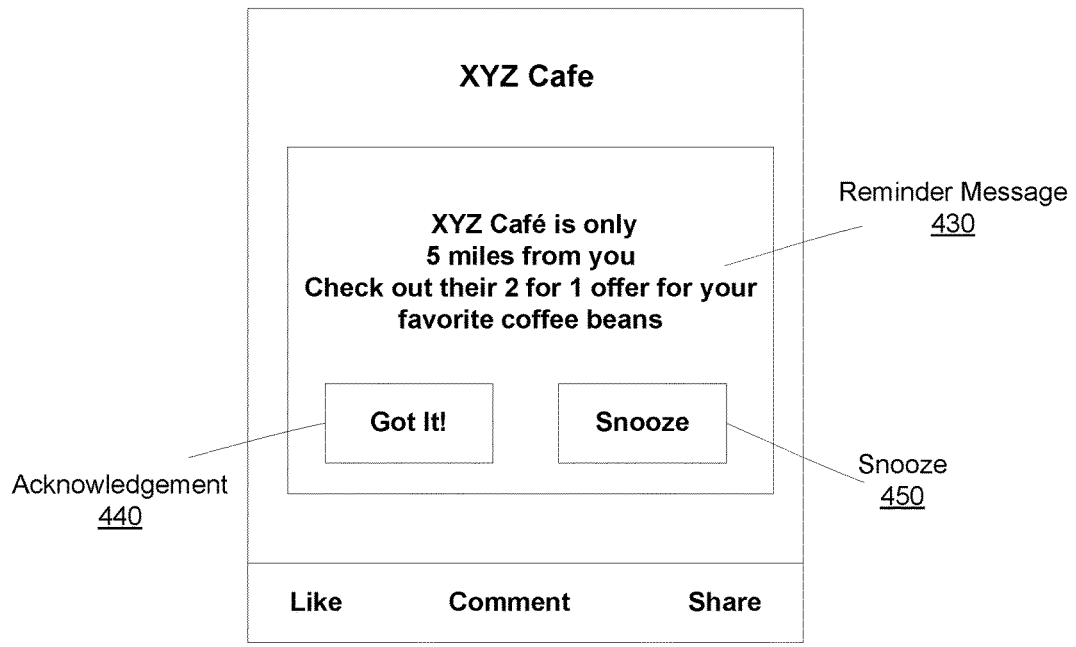
FIG. 4C is an example reminder presented to the user, in one embodiment.

FIG. 4A-C show another example sequence for presenting additional content to a user, in one embodiment. In this example, FIG. 4A shows an example sponsored content item 400A presented to a user on a client device 110. In this example, sponsored content item 400A is presented to the user to advertise a special offer offered by XYZ café. Sponsored content item 400A includes content identifying XYZ café, a message that in effect asks the user whether they would like to opt-in to receiving one or more reminders that include a special offer (i.e., "Buy a bag of Whole Bean Coffee and get a second for FREE next time you're in the area") when the user is within a defined distance of XYZ café, and a reminder button 410 that, when selected, allows the user to set or define the criteria for receiving the reminder (e.g., when the user is within a particular distance of XYZ café, at a particular shopping center or intersection, etc.). Content item 400A may additionally include information for a particular type or brand of coffee beans and so forth. In one embodiment, users that tap or click the reminder button 410 are presented with an input interface to set or define the criteria for receiving additional content, which can be presented in an overlay above content item 400A.

FIG. 4B shows example input interface 400B for sponsored content item 400A, in one embodiment. In this example, input interface 400B includes pre-determined location options 405 corresponding to a distance from XYZ café where the user would like to receive the reminder with the offer. In this example, the user selects to receive the reminder when the user is 5 miles away from XYZ café by selecting a box corresponding to 5 miles in location options 405 and subsequently selects the set reminder button 420. Further, the user may have also defined a new distance not listed in location options 405. For example, the user could have selected the 'Enter miles' option in location options 405 to select a desired distance from XYZ café for setting the reminder. Accordingly, online system 140 receives the criteria (e.g., 5 miles) from the user corresponding to a distance from XYZ café that the users wishes to be presented with the reminder for XYZ café via input interface 400B and online system 140 stores the criteria in the reminder store 235. As similarly described above, data corresponding to the user's selection is sent to content store 210 where this data is stored with other user selections after the user's selection of the criteria is confirmed and used to create collections of user selection data that can be used by content selection module 230 to adjust future content selection.

FIG. 4C shows example reminder 400C, in one embodiment. In this example, reminder 400C is presented to the user when the user is within 5 miles of XYZ Café after the user sets the reminder (i.e., as described with respect to FIG. 4B) and includes reminder message 430 which reminds the user to check out XYZ Café's current offer. Reminder 400C also includes acknowledgement button 440 and snooze button 450. In this example, acknowledgement button 440 allows the user to receive reminder 400C which may include a promotional code to obtain the 2-for-1 offer or acknowledgement button 440 could be provided to allow the user to close out of reminder 400C to no longer view and/or receive a reminder for, in this example, XYZ Café. Snooze button 450, however, allows the user to ignore the current instance of reminder 400C sent to the client device 110, but allow the user to receive another instance or notification of reminder 400C next time the user is near XYZ Café. Although the additional content is described in the examples above as a reminder (e.g., to purchase a product advertised, etc.) associated with a previously presented content item, the additional content is not limited to this application or use-case.

In some embodiments, reminder store 235 stores data for interactions by users with snooze button 450 to gather responses or actions made in response to being presented with a sponsored content item selected by the content selection module 230. For example, in response to action logger 215 receiving information corresponding to a user selecting snooze button 450 more than a threshold number of times within a predetermined time period (e.g., a week), online system 140 can send reminder store 235 an instruction to modify the predetermined criteria (e.g., time options 305 or location options 405) for selecting the additional content presented to the client device 110 in the input interface. Thus, these actions taken (e.g., which time periods are chosen for a particularly product, what distances from a particular location, etc.) can be used to adjust time periods or locations suggested to users in the input interface.

In some embodiments, a machine learning model is trained to learn a user's preferences based on what reminders the user creates and how the user responds to those reminders. For example, if the user always sets reminders on consumable goods like dog food and diapers, the online system can provide a more reminder options going forward on content items associated with consumables. If the user almost always snoozes the reminders, the online system can learn to provide the reminders later because the reminders may have been provided too soon.

The machine learning models can initially be trained by extracting features from content items for which the content emotional state has already been determined and creating a feature vector. Dimensionality reduction (e.g., via linear discriminant analysis, principle component analysis, etc.) can be used to reduce the amount of data in the feature vector to a smaller, more representative core set of features. Features extracted from text include keywords and features extracted from video or images may include text (e.g., metadata associated with the image or video), color, texture, motion rigidity, audio, etc. The training set for the machine learning model or classifiers that will be used is a subset of the overall data set that is representative of the data to be classified, including positive and negative examples of the reminders on which the model is being trained. In supervised training, the content items are labeled with the reminders that are presented in the content item and labeled with regard to user actions take regarding the reminders. The training outputs models or classifiers that can then be used to identify the reminders associated with other content items that the model has not encountered before and determine likely user response to the reminders. Machine learning algorithms used include support vector machines (SVMs), boosting for other algorithms (e.g., AdaBoost), neural net, logistic regression, naïve Bayes, memory-based learning, random forests, bagged trees, decision trees, boosted trees, boosted stumps, etc. The accuracy of the trained classifier is evaluate using a validation set that was formed as a disjoint set of the data for testing the trained classifiers to ensure the classifier generalizes to non-training data. Common metrics applied in accuracy measurement include: Precision=TP/TP+FP) and Recall=TP/(TP+FN), where precision is how many the classifier correctly guessed (TP or true positives) out of the total it predicted (TP+FP or false positives) and recall is how many it correctly guessed (TP) out of the total that did represent the concept (TP+FN or false negatives). The F score (F-score=2*PR/(P+R)) unifies the two into one measure, and the system can reject or iterate on the model as needed based on the accuracy measurement result. Ultimately, the trained classifier is used to label unknown content items with reminders based on the same features being extracted from these unknown content items.

In a further embodiment, the online system automatically reports to connections of a user within the social networking system about the user's creation of a reminder or about that the user received a reminder. If the user received the reminder in FIG. 4C and later posts about the coffee the user bought at XYZ Café, the system can report this information to the user's friend (e.g., in the friend's newsfeed) that the user used the reminder to remind him to buy the coffee when the user was in the right location. This may encourage other users to use similar reminders and may encourage other users to travel to XYZ Café to take advantage of the offer. In one embodiment, connections of the user who receive this report about the user's reminder are offered the option to create their own reminders about the same content item, thereby propagating the reminders across the social network.

Figure 5:
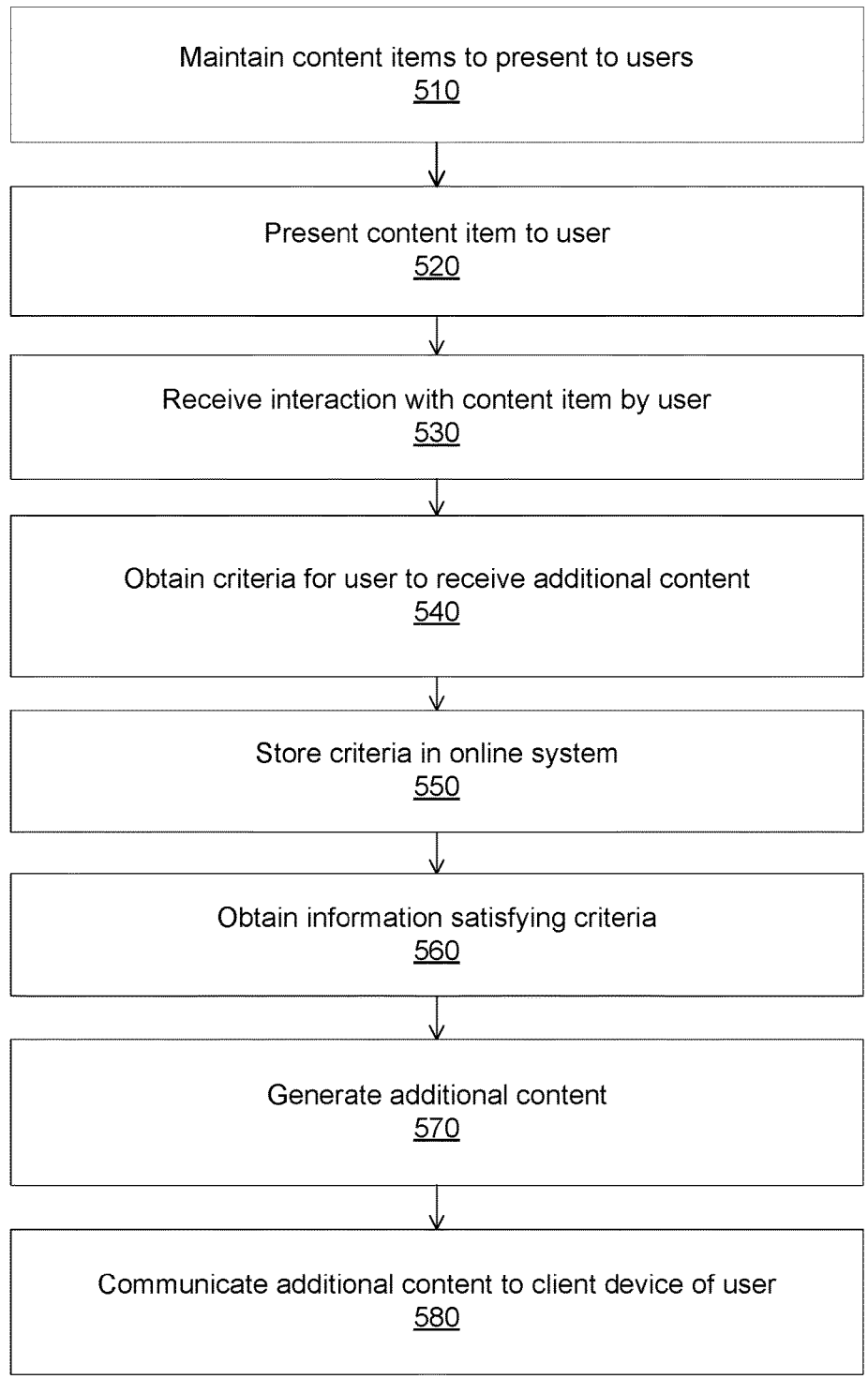
FIG. 5 is a process for providing reminders associated with content items to users of the online system, in one embodiment.

Providing Time and Location-Based Additional Content to Users of an Online System FIG. 5 is a flowchart for a process 500 for providing time and location-based additional content (e.g., sponsored reminders) to users of online system 140, in one embodiment. In some embodiments, the method may include different and or additional steps than those described in conjunction with FIG. 5. Additionally, in various embodiments, steps of the method may be performed in different orders than the order described in conjunction with FIG. 5.

An online system 140 maintains 510 content items. Content items may be obtained from users of the online system 140 or from third party systems 130 that communicate with the online system 140. Additionally, the online system 140 may obtain various content items based on information accessible to the online system 140. As further described above in conjunction with FIG. 2, the online system 140 presents content items to its users.

Accordingly, the online system 140 presents 520 a content item to a user of the online system. For example, the online system 140 selects content items for presentation to users and communicates selected content items to client devices 110 for presentation to the users. For example, the content items can be selected based on the user's browsing history, purchase history, or user feedback of the user as stored in the action log 220 of FIG. 2. As another example, the online system 140 communicates content items to a third party system 130 or to an application, and the third party system 130 or the application presents the content items to users. In particular, the content items can represent a sponsored content item for a product regularly purchased by a user from the user profile store 205 as described above with reference to FIG. 2.

In this example, the content item presented to the user includes a mechanism to allow the user receive additional content associated with the content item, such as a reminder described above. In various embodiments, this mechanism is a button or icon presented with the content item that allows the user to set or define criteria or parameters for receiving the additional content. For example, when the online system 140 receives a selection of the button or icon from the user, the online system 140 causes an input interface (e.g., a new page within the online system 140 or an overlay over the previously presented page displaying the content item) to be presented with options that the user may choose or define to set the criteria for receiving the additional content in the future.

Accordingly, in this example, the online system 140 receives 530 an interaction with the content item from the user. The interaction, in this example, represents a selection of the button or icon presented with the content item from the user. In response to receiving the interaction with the content item, the online system 140 presents the input interface on the client device 110 with a message prompting the user to set a reminder or other criteria to receive additional content related to the content item, as described above with reference to FIGS. 3 and 4. As described above, the input interface allows the user to input or provide criteria for receiving the additional content. For example, the criteria can be a certain number of weeks, days, or hours in the future or a specific date. The criteria could also be a location for which the user receives additional content associated with the content item upon coming within a threshold distance. In this example, the online system 140 obtains 540 criteria from the user to be satisfied for the user to receive the additional content related to or associated with the content item, such as a reminder to purchase more dog food. As mentioned above, the criteria can be a time period associated with future delivery of the reminder or a distance from a specific location, as described above with reference to FIG. 2. The online system 140 subsequently stores 550 the obtained criteria at the online system 140 in association with a user profile at the online system 140 for the user.

Accordingly, the online system 140 obtains 560 information or data satisfying the criteria set by the user for receiving the additional content. Here, the information or data obtained can include time data or a notification corresponding to the end of a time period. For example, if the user specified criteria to receive a reminder to purchase dog food in three week and three weeks has passed, the online system 140 obtains 560 information or data that three weeks have passed. In an alternative embodiment, the information or data obtained can be location or GPS data corresponding to a predetermined distance from a specified location (e.g., a store where the user can purchase dog food, the user's favorite sandwich shop, etc.). For example, if the user specified criteria to receive a reminder when the user was less than a five minute walk from the user's favorite coffee shop and an application associated with the online system 140 (e.g., an application for the online system 140 or in communication with the online system 140) determines (e.g., based on location data from the user's client device 110) that the user is within a distance from the coffee shop associated with less than or equal to a five minute walk time, the online system 140 is notified or triggered to reminder the user.

Once the online system 140 receives information or data for the user that corresponds to the user receiving additional content and the online system 140 determines that the received information or data at least meets or exceeds a threshold time limit, distance, or other quantity, the online system 140 generates 570 the additional content for the content item previously presented to the user. In one embodiment, the online system 140 generates a reminder to take an action associated with the content item when the time period chosen by the user expires. In another embodiment, the online system 140 generates a reminder when location information obtained from the user's client device 110 indicates that the user is in proximity of a retail location associated with the content item. Further, the additional content may include additional information for an event that the user opted-in to receive as the date of the event was closer. The additional content could also be additional information associated with landmarks, and so forth. Accordingly, once the online system 140 determines that the received information at least meets a threshold associated with the user specified criteria, the online system 140 communicates 580 the additional content for the content item to the client device 110 associated with the user.

In various embodiments, the additional content can be provided to the user as a notification of content to a user device 110. For example, a format associated with the content item can specify that the additional content or reminder is presented as a content item in a news feed including multiple content items, is presented as a text message sent to the user, is presented via a notification message sent to the user, or is presented using any other suitable format.

Conclusion

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:

receiving, by an online system, a request to present an advertisement to a plurality of users of the online system, the request including an ad creative for the advertisement, an ad reminder creative, and information defining one or more triggers corresponding to criteria to be satisfied for a user to receive the ad reminder, wherein the ad reminder creative includes a user acknowledgement button and a snooze button;

presenting the advertisement associated with the request to a user of the online system, the advertisement promoting a product associated with repeated purchases made at substantially regular intervals and including a first user interface provided for display to a client device of the user, the first user interface configured to allow the user to interact with the first user interface to indicate a desire to receive a reminder to purchase the product associated with the advertisement at a later time;

receiving one or more interactions with the user interface of the advertisements by the user of the online system indicating the desire to receive the reminder to purchase the product associated with the advertisement at the later time;

responsive to receiving the one or more interactions with the advertisement,
  preselecting, for the user, one or more of the criteria to be satisfied for the user to receive the ad reminder based at least in part on at least one of browsing history, purchase history, or user feedback of the user, the one or more preselected criteria for the user including a time interval associated with future delivery of the reminder;
  presenting a second user interface on the client device that includes a message prompting the user to set the reminder to receive the ad reminder by specifying the one or more preselected criteria; and
  obtaining, via the second user interface, a user selection to one of the one or more preselected criteria from the user to be satisfied for the user to receive the ad reminder for the product being promoted by the advertisement;

storing the obtained one or more preselected criteria at the online system in association with the user and with the advertisement;

responsive to the one or more preselected criteria being satisfied for the user including an expiration of the time interval, generating the ad reminder for the user to purchase to product;

communicating the ad reminder to the client device associated with the user for presentation to the user, the acknowledgement button when selected by the user causes the ad reminder to be closed, the snooze button when selected by the user causes the ad reminder to be closed while causing the ad reminder to repeat after a period of time that is less than the time interval associated with future delivery of the ad reminder;

receiving indications of the user purchasing the product a plurality of times including at a first time and at least second time;

comparing an observed time interval between purchases corresponding to the first time and the at least second time to the time interval associated with the one or more preselected criteria; and adjusting the time interval associated with the future delivery of the ad reminder based on at least one of a difference between the time interval and the observed time period.

2. The method of claim 1, wherein the one or more preselected criteria from the user to be satisfied for the user to receive the reminder further includes the client device of the user being within a threshold distance of a geographic location associated with the advertisement.

3. The method of claim 2, wherein the geographic location associated with the content item is a retail location where the user can purchase the product being promoted via the advertisement.

4. A method comprising:

receiving, by an online system, a request to present an advertisement to a plurality of users of the online system, the request including an ad creative for the advertisement, an ad reminder creative, and information defining one or more triggers corresponding to criteria to be satisfied for a user to receive the ad reminder, wherein the advertisement includes a reminder icon and the ad reminder creative includes a user acknowledgement button and a snooze button;

presenting the advertisement associated with the request to a user of the online system, the advertisement promoting a product associated with repeated purchases made at substantially regular intervals and including the reminder icon to allow the user to define the criteria to be satisfied for the user to receive the ad reminder reminding the user to purchase the product at a later time;

receiving a selection to the reminder icon of the advertisement by the user of the online system, the selection indicating a desire to receive the ad reminder to purchase the product associated with the advertisement at the later time;

responsive to receiving the selection to the reminder icon,
  preselecting, for the user, one or more of the criteria to be satisfied for the user to receive the ad reminder based at least in part on at least one of browsing history, purchase history, or user feedback of the user, the one or more preselected criteria from the user including a time interval associated with future delivery of the reminder;
  presenting a user interface associated with the advertisement on a client device of the user that includes a message prompting the user to set the reminder to receive the ad reminder by specifying the one or more preselected criteria; and
  obtaining, via the user interface, a user selection to one of the one or more criteria from the user to be satisfied for the user to receive the ad reminder for the product being promoted by the advertisement;

storing the obtained one or more preselected criteria at the online system in association with the user and with the advertisement;

responsive to at least an expiration of the time interval associated with future delivery of the reminder, generating the ad reminder for the user to purchase to product associated with the advertisement; and presenting the ad reminder to the client device associated with the user for presentation to the user, the reminder including the user acknowledgement button and the snooze button, the user acknowledgement button when selected by the user causes the ad reminder to be closed, the snooze button when selected by the user causes the ad reminder to be closed while causing the ad reminder to repeat after a period of time that is less than the time interval associated with future delivery of the ad reminder;

receiving an indication that the user purchased the product at a first time and at least a second time;

comparing an observed time period between purchases corresponding to the first time and at least the second time to the time period associated with the one or more preselected criteria; and adjusting the time period provided in the advertisement based on a difference between the time period and the observed time period.

5. The method of claim 4, wherein the one or more preselected criteria from the user to be satisfied for the user to receive the reminder further includes the client device of the user being within a threshold distance of a geographic location associated with the advertisement.

6. The method of claim 5, wherein the geographic location associated with the content item is a retail location where the user can purchase the product being promoted via the advertisement.

7. A non-transitory computer-readable storage medium including instructions that, when executed by a processor, cause the processor to:

receive, by an online system, a request to present an advertisement to a plurality of users of the online system, the request including an ad creative for the advertisement, an ad reminder creative, and information defining one or more triggers corresponding to criteria to be satisfied for a user to receive the ad reminder, wherein the advertisement includes a reminder icon and the ad reminder creative includes a user acknowledgement button and a snooze button;

present the advertisement associated with the request to a user of the online system, the advertisement promoting a product associated with repeated purchases made at substantially regular intervals and including a first user interface provided for display to a client device of the user, the user interface configured to allow the user to interact with the first user interface to indicate a desire to receive the ad reminder to purchase the product associated with the advertisement at a later time and to define one or more of the criteria to be satisfied for the user to receive the ad reminder;

receive one or more interactions with the user interface of the advertisement by the of the online system indicating the desire to receive the ad reminder to purchase the product associated with the advertisement at the later time;

responsive to receiving the one or more interactions with the advertisement, preselect, for the user, one or more of the criteria to be satisfied for the user to receive the ad reminder based at least in part on at least one of browsing history, purchase history, or user feedback of the user, the one or more preselected criteria from the user including a time interval associated with future delivery of the reminder;

present a second user interface on the client device that includes a message prompting the user to set the reminder to receive the ad reminder by specifying the one or more preselected criteria; and obtain, via the second user interface, a user selection to one of the one or more preselected criteria from the user to be satisfied for the user to receive the ad reminder for the product being promoted by the advertisement;

store the obtained one or more preselected criteria at the online system in association with the user and with the advertisement;

responsive to the one or more preselected criteria being satisfied for the user including an expiration of the time interval, generate the ad reminder for the user to purchase to product; and present the ad reminder to the user on the client device of the user, the reminder including the user acknowledgement button and the snooze button, the acknowledgement button when selected by the user causes the ad reminder to be closed, the snooze button when selected by the user causes the reminder to be closed while causing the reminder to repeat after a period of time that is less than the time interval associated with future delivery of the ad reminder;

receive an indication that the user purchased the product at a first time and at a at least second time;

compare an observed time interval between purchases corresponding to the first time and the at least second time to the time interval associated with the one or more preselected criteria; and adjust the time interval associated with the future delivery of the reminder based on at least one of a difference between the time interval and the observed time period.

8. The non-transitory computer-readable storage medium of claim 7, wherein the one or more preselected criteria from the user to be satisfied for the user to receive the ad reminder further includes the client device of the user being within a threshold distance of a geographic location associated with the advertisement.

9. The non-transitory computer-readable storage medium of claim 8, wherein the geographic location associated with the advertisement is a retail location where the user can purchase the product being promoted via the advertisement.

* * * * *